US010717196B2

(12) United States Patent
Yamazaki et al.

(10) Patent No.: US 10,717,196 B2
(45) Date of Patent: Jul. 21, 2020

(54) MACHINE LEARNING DEVICE, ROBOT SYSTEM, AND MACHINE LEARNING METHOD FOR LEARNING WORKPIECE PICKING OPERATION

(71) Applicants: FANUC CORPORATION, Yamanashi (JP); Preferred Networks, Inc., Tokyo (JP)

(72) Inventors: Takashi Yamazaki, Yamanashi (JP); Takumi Oyama, Yamanashi (JP); Shun Suyama, Yamanashi (JP); Kazutaka Nakayama, Yamanashi (JP); Hidetoshi Kumiya, Yamanashi (JP); Hiroshi Nakagawa, Yamanashi (JP); Daisuke Okanohara, Tokyo (JP); Ryosuke Okuta, Tokyo (JP); Eiichi Matsumoto, Tokyo (JP); Keigo Kawaai, Tokyo (JP)

(73) Assignees: FANUC CORPORATION, Yamanashi (JP); PREFERRED NETWORKS, INC., Tokyo (JP)

( * ) Notice: Subject to any disclaimer, the term of this patent is extended or adjusted under 35 U.S.C. 154(b) by 0 days.

(21) Appl. No.: 15/223,141

(22) Filed: Jul. 29, 2016

(65) Prior Publication Data
US 2017/0028562 A1    Feb. 2, 2017

(30) Foreign Application Priority Data

Jul. 31, 2015 (JP) .................................. 2015-152067
Nov. 30, 2015 (JP) .................................. 2015-233857

(51) Int. Cl.
*B25J 9/16* (2006.01)

(52) U.S. Cl.
CPC ............. *B25J 9/1697* (2013.01); *B25J 9/163* (2013.01); *B25J 9/1612* (2013.01);
(Continued)

(58) Field of Classification Search
CPC .................. B25J 9/1612; B25J 9/1697; G05B 2219/37567; G05B 2219/39476; G05B 2219/40053
See application file for complete search history.

(56) References Cited

U.S. PATENT DOCUMENTS 5,172,253 A    12/1992  Lynne
6,394,731 B1    5/2002  Konosu et al.
(Continued)

FOREIGN PATENT DOCUMENTS

CN    1380846 A    11/2002
CN    101051215 A    10/2007
(Continued)

OTHER PUBLICATIONS

Wunsch; "Real-time pose estimation of 3-D objects from camera images using neural networks"; Proceedings of the 1997 IEEE International Conference on Robotics and Automation; vol. 4; pp. 3232-3237; 1997) (Year: 1997).*
(Continued)

*Primary Examiner* — Stephen Holwerda
(74) *Attorney, Agent, or Firm* — Hauptman Ham, LLP

(57) ABSTRACT

A machine learning device that learns an operation of a robot for picking up, by a hand unit, any of a plurality of workpieces placed in a random fashion, including a bulk-loaded state, includes a state variable observation unit that observes a state variable representing a state of the robot, including data output from a three-dimensional measuring device that obtains a three-dimensional map for each workpiece, an operation result obtaining unit that obtains a result of a picking operation of the robot for picking up the workpiece by the hand unit, and a learning unit that learns a manipulated variable including command data for commanding the robot to perform the picking operation of the workpiece, in association with the state variable of the robot (Continued)

and the result of the picking operation, upon receiving output from the state variable observation unit and output from the operation result obtaining unit.

21 Claims, 6 Drawing Sheets

(52) U.S. Cl.
CPC .............. *G05B 2219/33056* (2013.01); *G05B 2219/37567* (2013.01); *G05B 2219/39476* (2013.01); *G05B 2219/40053* (2013.01)

(56) References Cited

U.S. PATENT DOCUMENTS

| | | | |
|---|---|---|---|
| 2002/0158599 | A1 | 10/2002 | Fujita et al. |
| 2005/0071048 | A1* | 3/2005 | Watanabe .............. B25J 9/1664 700/259 |
| 2007/0239644 | A1 | 10/2007 | Minamino et al. |
| 2007/0274812 | A1 | 11/2007 | Ban et al. |
| 2007/0282485 | A1* | 12/2007 | Nagatsuka ............. B25J 9/1671 700/245 |
| 2009/0105881 | A1 | 4/2009 | Wang et al. |
| 2010/0087955 | A1 | 4/2010 | Tsusaka et al. |
| 2010/0092032 | A1* | 4/2010 | Boca ....................... B25J 9/1679 382/103 |
| 2010/0114807 | A1 | 5/2010 | Ueda et al. |
| 2010/0262286 | A1 | 10/2010 | Eidenberger et al. |
| 2011/0015785 | A1 | 1/2011 | Tsusaka et al. |
| 2012/0158180 | A1 | 6/2012 | Iio et al. |
| 2012/0253514 | A1 | 10/2012 | Sugimoto et al. |
| 2013/0345873 | A1 | 12/2013 | Blumberg et al. |
| 2014/0031985 | A1 | 1/2014 | Kumiya |
| 2014/0067127 | A1 | 3/2014 | Gotou |
| 2014/0114888 | A1 | 4/2014 | Noda et al. |
| 2015/0039129 | A1 | 2/2015 | Yasuda et al. |
| 2015/0100530 | A1 | 4/2015 | Mnih et al. |

FOREIGN PATENT DOCUMENTS

| | | | |
|---|---|---|---|
| CN | 103753557 | A | 4/2014 |
| EP | 1862270 | B1 | 5/2012 |
| JP | H05088721 | A | 4/1993 |
| JP | H06203166 | A | 7/1994 |
| JP | H11175132 | A | 7/1999 |
| JP | H11272845 | A | 10/1999 |
| JP | 2000-94374 | A | 4/2000 |
| JP | 2005-103681 | A | 4/2005 |
| JP | 2005-199383 | A | 7/2005 |
| JP | 2006-320997 | A | 11/2006 |
| JP | 2007-313624 | A | 12/2007 |
| JP | 2007326160 | A | 12/2007 |
| JP | 2009-262279 | A | 11/2009 |
| JP | 2010134907 | A | 6/2010 |
| JP | 2010-244549 | A | 10/2010 |
| JP | 2012208789 | A | 10/2012 |
| JP | 2013-52490 | A | 3/2013 |
| JP | 2014-81863 | A | 5/2014 |
| JP | 2014-206795 | A | 10/2014 |
| JP | 5642738 | B2 | 12/2014 |
| JP | 5670397 | B2 | 2/2015 |

OTHER PUBLICATIONS

Kroemer; "Combining active learning and reactive control for robot grasping"; Robotics and Autonomous Systems; vol. 58; pp. 1105-1116; 2010 (Year: 2010).*
Noboru Sugino, "Grasping Control of a Robot Hand by Reinforcement Learning", vol. 121-C No. 4, Apr. 1, 2001, pp. 710-717, The Institute of Electrical Engineers of Japan (IEEJ), Tokyo, Japan.
Office Action in U.S. Appl. No. 15/222,947, dated Dec. 31, 2018, 18pp.
Mnih et al., "Human-level control through deep reinforcement learning," Nature, Feb. 26, 2015, pp. 529-533 (13 pages), vol. 518, Macmillan Publishers Limited.
Shibata et al., "Learning of Action Generation from Raw Camera Images in a Real-World-like Environment by Simple Coupling of Reinforcement Learning and a Neural Network," Advances in Neuro-Information Processing (Proc. of ICONIP'08), 2009, pp. 754-761, vol. 5506, Lecture Notes in Computer Science, Oita, Japan.
Shibata et al., "Direct-Vision-Based Reinforcement Learning Using a Layered Neural Network—For the Whole Process from Sensors to Motors-," Transactions of the Society of Instrument and Control Engineers, Feb. 2001, pp.168-177, vol. 37, No. 2.
Non-Final Office Action issued in U.S. Appl. No. 15/222,947, dated Jan. 10, 2018, 26 pages.
Final Office Action issued in U.S. Appl. No. 15/222,947, dated May 24, 2018, 18 pages.
Office Action in U.S. Appl. No. 16/371,809, dated Oct. 7, 2019, 26 pgs.
Final Office Action issued in U.S. Appl. No. 16/371,809, dated Feb. 13, 2020, 17 pages.
J. Mahler, et al., "Dex-Net 1.0: A Cloud-Based Network of 3D Objects for Robust Grasp Planning Using a Multi-Armed Bandit Model with Correlated Reward", http://berkeleyautomation.github.io/dex-net/, May 21, 2016. 8pp.
Lerrel Pinto and Abhinav Gupta, "Supersizing Self-supervision: Learning to Grasp from 50K Tries and 700 Robot Hours", The Robotics Institute, Carnegie Mellon University, Sep. 23, 2015. 8pp.
Lin et al., "Dual Reinforcement Learning Based on Bias Learning", Journal of Computer Research and Development, 2008, 45(9): 1455-1462, Sep. 15, 2008, 8pp.

* cited by examiner

FIG. 6
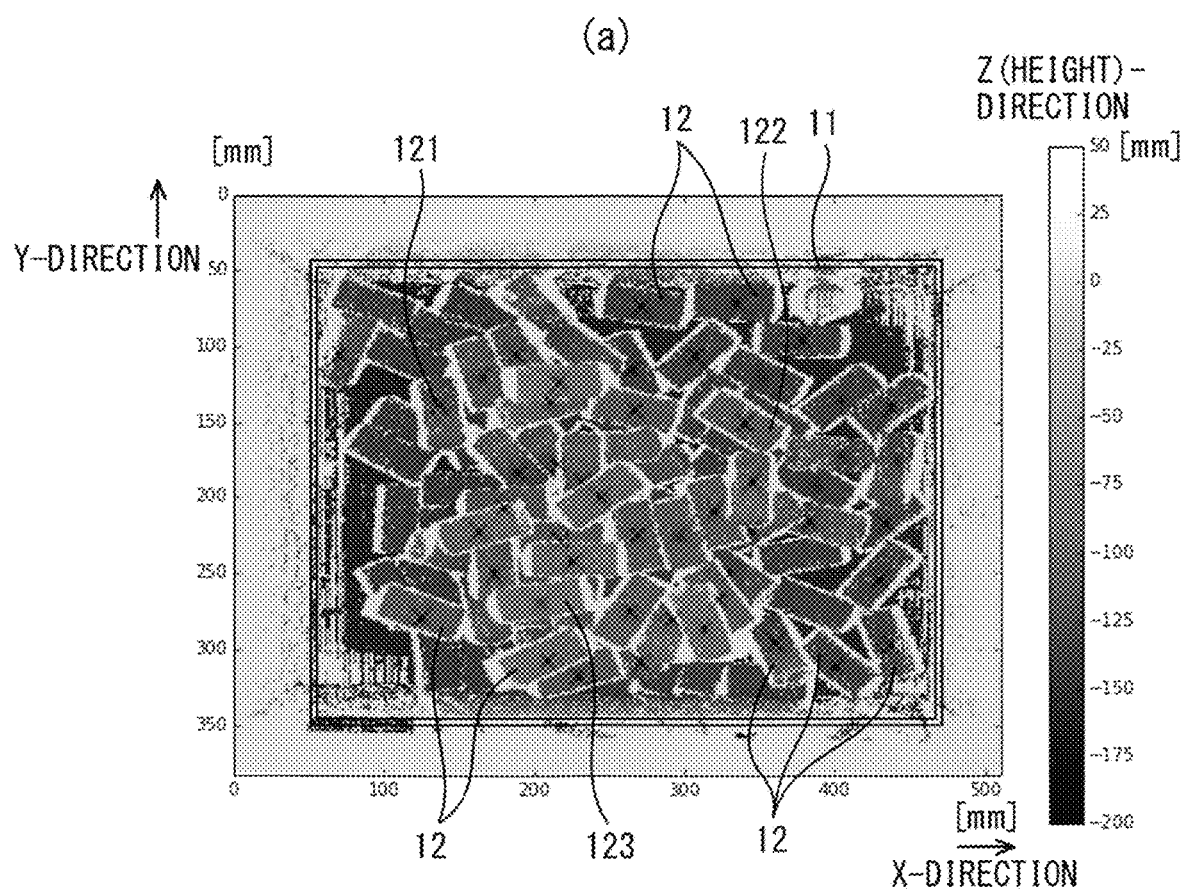
(b)         (c)         (d)
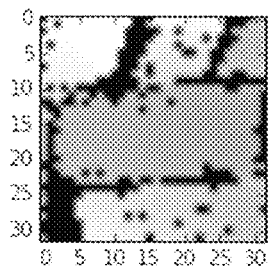 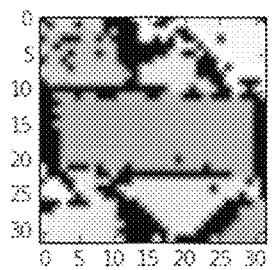 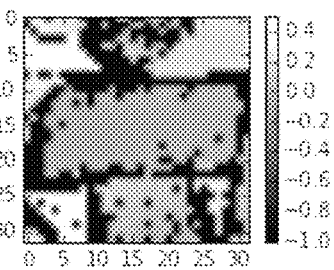

MACHINE LEARNING DEVICE, ROBOT SYSTEM, AND MACHINE LEARNING METHOD FOR LEARNING WORKPIECE PICKING OPERATION

RELATED APPLICATIONS

The present application claims priority to Japanese Patent Application Number 2015-152067, filed Jul. 31, 2015, and Japanese Patent Application Number 2015-233857, filed Nov. 30, 2015, the disclosure of which is hereby incorporated by reference herein in its entirety.

BACKGROUND OF THE INVENTION

1. Field of the Invention

The present invention relates to a machine learning device, a robot system, and a machine learning method for learning an operation for picking up workpieces placed in a random fashion, including a bulk-loaded state.

2. Description of the Related Art

One conventionally-known robot system grips and transports workpieces packed in bulk in a basket-shaped box, using the hand unit of a robot, as disclosed in, e.g., Japanese Patent Nos. 5642738 and 5670397. Such a robot system, for example, obtains the position information of a plurality of workpieces using a three-dimensional measuring device located above a basket-shaped box and picks up the workpieces one by one, based on the obtained position information, using the hand unit of a robot.

Unfortunately, the above-mentioned conventional robot system may preferably involve, e.g., presetting how to extract a workpiece to be picked up, from distance images of a plurality of workpieces measured by a three-dimensional measuring device, and the position at which a workpiece to be picked up is located. It may further be preferable to program, in advance, how to operate the hand unit of a robot when a workpiece is picked up. As a specific example, a human may preferably teach the robot to perform a picking operation of a workpiece, using a teaching pendant.

When the setting for extracting a workpiece to be picked up from distance images of a plurality of workpieces is inappropriate, or an operation program for a robot is not appropriately created, the success rate of picking up and transporting a workpiece by the robot lowers. To improve the success rate, the workpiece detection setting and the operation program for a robot may be preferably refined while searching for an optimal operation of the robot through trial and error by a human.

In consideration of the above-described situation, it is an object of the present invention to provide a machine learning device, a robot system, and a machine learning method which can learn an optimal operation of a robot in picking up workpieces placed in a random fashion, including a bulk-loaded state, without human intervention.

SUMMARY OF INVENTION

According to a first aspect, there is provided a machine learning device that learns an operation of a robot for picking up, by a hand unit, any of a plurality of workpieces placed in a random fashion, including a bulk-loaded state, the device including a state variable observation unit that observes a state variable representing a state of the robot, including data output from a three-dimensional measuring device that obtains a three-dimensional map for each workpiece; an operation result obtaining unit that obtains a result of a picking operation of the robot for picking up the workpiece by the hand unit; and a learning unit that learns a manipulated variable including command data for commanding the robot to perform the picking operation of the workpiece, in association with the state variable of the robot and the result of the picking operation, upon receiving output from the state variable observation unit and output from the operation result obtaining unit. The machine learning device may further include a decision unit that decides the command data for commanding the robot by referring to the manipulated variable learned by the learning unit.

According to a second aspect, there is provided a machine learning device that learns an operation of a robot for picking up, by a hand unit, any of a plurality of workpieces placed in a random fashion, including a bulk-loaded state, the device including a state variable observation unit that observes a state variable representing a state of the robot, including data output from a three-dimensional measuring device that measures a three-dimensional map for each workpiece; an operation result obtaining unit that obtains a result of a picking operation of the robot for picking up the workpiece by the hand unit; and a learning unit that learns a manipulated variable including a measurement parameter of the three-dimensional measuring device, in association with the state variable of the robot and the result of the picking operation, upon receiving output from the state variable observation unit and output from the operation result obtaining unit. The machine learning device may further include a decision unit that decides the measurement parameter of the three-dimensional measuring device by referring to the manipulated variable learned by the learning unit.

The state variable observation unit may further observe a state variable of the robot, including data output from a coordinate computation unit that computes a three-dimensional position for each workpiece, based on the output of the three-dimensional measuring device. The coordinate computation unit may further compute an orientation for each workpiece and outputs data of the three-dimensional position and the orientation computed for each workpiece. The operation result obtaining unit may utilize the data output from the three-dimensional measuring device. The machine learning device may further include a preprocessing unit that processes the data output from the three-dimensional measuring device, before the data is input to the state variable observation unit, wherein the state variable observation unit may receive data output from the preprocessing unit as a state variable of the robot. The preprocessing unit may uniform each workpiece in direction and height in the data output from the three-dimensional measuring device. The operation result obtaining unit may obtain at least one of information indicating one of success and failure of picking of the workpiece, a state of damage of the workpiece, and an achievement level in transferring the picked workpiece to a post-process.

The learning unit may include a reward computation unit that computes a reward, based on output of the operation result obtaining unit; and a value function update unit that includes a value function describing a value of the picking operation of the workpiece and updates the value function in accordance with the reward. The learning unit may include a learning model for learning the picking operation of the workpiece, and the learning unit may further include an error computation unit that computes an error, based on output of the operation result obtaining unit and output of the learning model; and a learning model update unit that updates the learning model in accordance with the error. The machine learning device may include a neural network.

According to a third aspect, there is provided a robot system including a machine learning device that learns an operation of a robot for picking up, by a hand unit, any of a plurality of workpieces placed in a random fashion, including a bulk-loaded state, the device including a state variable observation unit that observes a state variable representing a state of the robot, including data output from a three-dimensional measuring device that obtains a three-dimensional map for each workpiece; an operation result obtaining unit that obtains a result of a picking operation of the robot for picking up the workpiece by the hand unit; and a learning unit that learns a manipulated variable including command data for commanding the robot to perform the picking operation of the workpiece, in association with the state variable of the robot and the result of the picking operation, upon receiving output from the state variable observation unit and output from the operation result obtaining unit, wherein the system further includes the robot; the three-dimensional measuring device; and a controller that independently controls the robot and the three-dimensional measuring device.

According to a fourth aspect, there is provided a robot system including a machine learning device that learns an operation of a robot for picking up, by a hand unit, any of a plurality of workpieces placed in a random fashion, including a bulk-loaded state, the device including a state variable observation unit that observes a state variable representing a state of the robot, including data output from a three-dimensional measuring device that measures a three-dimensional map for each workpiece; an operation result obtaining unit that obtains a result of a picking operation of the robot for picking up the workpiece by the hand unit; and a learning unit that learns a manipulated variable including a measurement parameter of the three-dimensional measuring device, in association with the state variable of the robot and the result of the picking operation, upon receiving output from the state variable observation unit and output from the operation result obtaining unit, wherein the system further includes the robot; the three-dimensional measuring device; and a controller that independently controls the robot and the three-dimensional measuring device.

The robot system may include a plurality of robots, the machine learning device is provided to each robot, and the plurality of machine learning devices provided to the plurality of robots are configured to share or exchange data with each other via a communication medium. The machine learning device may be located on a cloud server.

According to a fifth aspect, there is provided a machine learning method for learning an operation of a robot for picking up, by a hand unit, any of a plurality of workpieces placed in a random fashion, including a bulk-loaded state, the method including observing a state variable representing a state of the robot, including data output from a three-dimensional measuring device that measures a three-dimensional position for each workpiece; obtaining a result of a picking operation of the robot for picking up the workpiece by the hand unit; and learning a manipulated variable including command data for commanding the robot to perform the picking operation of the workpiece, in association with the observed state variable of the robot and the obtained result of the picking operation of the robot, upon receiving the state variable and the result of the picking operation of the robot.

BRIEF DESCRIPTION OF THE DRAWINGS

The present invention will be more clearly understood by reference to the accompanying drawings, in which:

FIG. 6 illustrates views (a)-(d) for explaining exemplary processing of a preprocessing unit in the robot system illustrated as FIG. 5.

DETAILED DESCRIPTION

Figure 1:
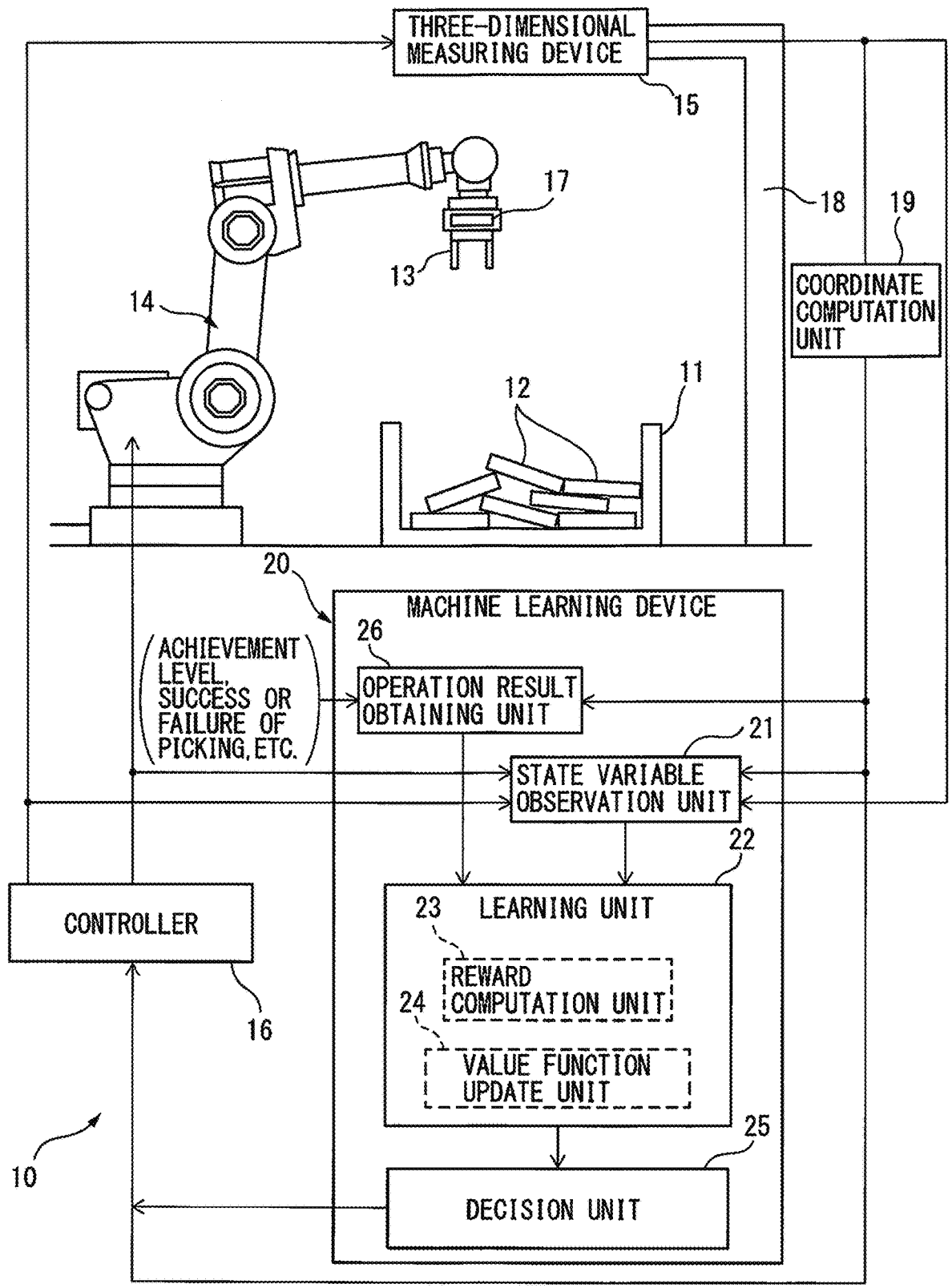
FIG. 1 is a block diagram illustrating the conceptual configuration of a robot system in an embodiment of the present invention.

A machine learning device, a robot system, and a machine learning method according to the present invention will be described in detail below with reference to the accompanying drawings. However, it is to be understood that the present invention should be limited neither to the drawings nor to the following embodiments. In the drawings, the same reference numerals denote the same members. Further, the same reference numerals in different drawings denote components having the same functions. To facilitate understanding, these drawings use different scales as appropriate.

FIG. 1 is a block diagram illustrating the conceptual configuration of a robot system in an embodiment of the present invention. A robot system 10 in this embodiment includes a robot 14, a three-dimensional measuring device 15, a controller 16, a coordinate computation unit 19, and a machine learning device 20. The robot 14 is equipped with a hand unit 13 which grips workpieces 12 packed in bulk in a basket-shaped box 11. The three-dimensional measuring device 15 measures a three-dimensional map of the surfaces of the workpieces 12. The controller 16 independently controls the robot 14 and the three-dimensional measuring device 15.

The machine learning device 20 includes a state variable (state quantity) observation unit 21, an operation result obtaining unit 26, a learning unit 22, and a decision unit 25. The machine learning device 20 learns and outputs manipulated variables such as command data for commanding the robot 14 to perform a picking operation of the workpiece 12 or measurement parameters of the three-dimensional measuring device 15, as will be described later.

The robot 14 is implemented in, e.g., a six-axis multi-articulated robot. The respective drive shafts of the robot 14 and the hand unit 13 are controlled by the controller 16. The robot 14 is used to pick up the workpieces 12 one by one from the box 11 placed at a predetermined position to sequentially move them to a designated position such as a conveyor or a worktable (not illustrated).

In picking up the workpieces 12 loaded in bulk from the box 11, the hand unit 13 or the workpieces 12 may collide or come into contact with the wall of the box 11. In other cases, the hand unit 13 or one workpiece 12 may get caught on another workpiece 12. In such a case, the function of detecting force acting on the hand unit 13 may be preferably used to immediately avoid imposing too much load on the robot 14. For this reason, a six-axis force sensor 17 is interposed between the hand unit 13 and the tip of the arm unit of the robot 14. The robot system 10 in this embodiment also includes the function of estimating a force acting on the hand unit 13, based on the current value of a motor (not illustrated) which drives the drive shaft of each joint unit of the robot 14.

Since the force sensor 17 can detect a force acting on the hand unit 13, it can also be determined whether the hand unit 13 actually grips the workpiece 12. In other words, when the hand unit 13 grips the workpiece 12, the weight of the workpiece 12 acts on the hand unit 13, and it can thus be determined that the hand unit 13 grips the workpiece 12 when the value detected by the force sensor 17 is larger than a predetermined threshold after the workpiece 12 is picked up. It may also be determined whether the hand unit 13 grips the workpiece 12, based on, e.g., data captured by a camera used for the three-dimensional measuring device 15 or the output of a photoelectric sensor (not illustrated) or the like attached to the hand unit 13. This determination may be performed based on data obtained by a pressure gauge for a suction hand (to be described later).

The hand unit 13 may take various forms as long as it can hold the workpiece 12. For example, the hand unit 13 may take a form in which it grips the workpiece 12 by opening and closing of two or more gripper portions, or include an electromagnet or a negative pressure generator which generates a suction force to act on the workpiece 12. In other words, although the hand unit 13 grips the workpiece with its two gripper portions in FIG. 1, the hand unit 13 is not limited to this, as a matter of course.

The three-dimensional measuring device 15 is placed at a predetermined position above a plurality of workpieces 12 by a support unit 18 to measure the plurality of workpieces 12. Examples of the three-dimensional measuring device 15 may include a three-dimensional vision sensor which obtains three-dimensional position information by image processing of image data of the workpieces 12 captured by two cameras (not illustrated). More specifically, a three-dimensional map (the surface positions of a plurality of workpieces 12 loaded in bulk) is measured using, e.g., the triangulation method, the optical cutting method, the time-of-flight method, the depth from defocus method, or a combination thereof.

The coordinate computation unit 19 computes (measures) the surface positions of a plurality of workpieces 12 loaded in bulk, using the three-dimensional map obtained by the three-dimensional measuring device 15 as input. In other words, three-dimensional position data (x, y, z) or three-dimensional position data (x, y, z) and orientation data (w, p, r) can be obtained for each workpiece 12, using the output of the three-dimensional measuring device 15. Although the state variable observation unit 21 receives both the three-dimensional map from the three-dimensional measuring device 15 and the position data (orientation data) from the coordinate computation unit 19 and observes the state variable (state quantity) representing a state of the robot 14, it may also receive, e.g., only the three-dimensional map from the three-dimensional measuring device 15 and observe the state variable of the robot 14. A preprocessing unit 50 may be added and used to process (preprocess) the three-dimensional map from the three-dimensional measuring device 15 before the three-dimensional map is input to the state variable observation unit 21, and then input the processed three-dimensional map to the state variable observation unit 21, as will be described later with reference to FIG. 5.

The relative position between the robot 14 and the three-dimensional measuring device 15 is determined by calibration in advance. The three-dimensional measuring device 15 according to the present invention may be a laser distance meter, in place of a three-dimensional vision sensor. In other words, the distance from the position of the three-dimensional measuring device 15 to the surface of each workpiece 12 may be measured by laser scanning, or various sensors such as a monocular camera or a touch sensor may be used to obtain three-dimensional position and orientation data (x, y, z, w, p, r) of a plurality of workpieces 12 loaded in bulk.

In other words, according to the present invention, a three-dimensional measuring device 15 which uses any type of three-dimensional measuring method is applicable as long as, for example, data (x, y, z, w, p, r) can be obtained for each workpiece 12. In addition, the mode in which a three-dimensional measuring device 15 is located is not particularly limited, and the three-dimensional measuring device 15 may be fixed to a floor, a wall, or the like, or attached to the arm unit of the robot 14 or the like.

The three-dimensional measuring device 15 obtains a three-dimensional map of a plurality of workpieces 12 packed in bulk in the box 11 in response to a command from the controller 16. The coordinate computation unit 19 obtains (computes) data of the three-dimensional positions (orientations) of the plurality of workpieces 12, based on the three-dimensional map, and outputs the data to the controller 16, and the state variable observation unit 21 and the operation result obtaining unit 26 of the machine learning device 20 (to be described later). Especially, the coordinate computation unit 19, for example, estimates the boundary between one workpiece 12 and another workpiece 12 or between the workpieces 12 and the box 11, based on image data generated by capturing the plurality of workpieces 12, to obtain three-dimensional position data for each workpiece 12.

The three-dimensional position data for each workpiece 12 refers to, e.g., data obtained by estimating the position at which each of a plurality of workpieces 12 loaded in bulk is located or can be held, from the positions of a plurality of points on the surfaces of the workpieces 12. The three-dimensional position data for each workpiece 12 may include data of the orientations of the workpieces 12, as a matter of course.

Obtaining three-dimensional position and orientation data for each workpiece 12 by the coordinate computation unit 19 includes the use of the machine learning technique. Object recognition, angle estimation, or the like from an input image, a laser distance meter, or the like, using a technique such as supervised learning (to be described later), is also applicable.

When three-dimensional data for each workpiece 12 is input from the three-dimensional measuring device 15 to the controller 16 via the coordinate computation unit 19, the controller 16 controls an operation of the hand unit 13 for picking up one workpiece 12 from the box 11. At this time, motors (not illustrated) for the axes of the hand unit 13 and the robot 14 are driven based on command values (manipulated variables) corresponding to an optimal position, orientation, and picking direction of the hand unit 13 obtained by the machine learning device 20 (to be described later).

The machine learning device 20 may also learn variables for the image capturing conditions of a camera used for the three-dimensional measuring device 15 (measurement parameters of the three-dimensional measuring device 15: e.g., the exposure time adjusted in image capturing using an exposure meter, and the illuminance of an illumination system which illuminates an object to be captured), and control the three-dimensional measuring device 15 based on the learned measurement parameter manipulated variables via the controller 16. Variables for the position and orientation estimation conditions used to estimate the position and orientation at which each workpiece 12 is located or can be held, from the positions of the plurality of workpieces 12 measured by the three-dimensional measuring device 15, may be included in the data output from the above-mentioned three-dimensional measuring device 15.

Further, data output from the three-dimensional measuring device 15 may be preprocessed by, e.g., the preprocessing unit 50 (to be described in detail later with reference to FIG. 5), and the processed data (image data) may be fed to the state variable observation unit 21, as described earlier. The operation result obtaining unit 26 can, for example, obtain a result of picking up the workpiece 12 by the hand unit 13 of the robot 14 from data output from the three-dimensional measuring device 15 (data output from the coordinate computation unit 19), but can even obtain the achievement level in transferring the picked workpiece 12 to a post-process, and an operation result indicating whether the picked workpiece 12 suffers from changes such as breakage, via other means (e.g., a camera or a sensor set in the post-process), as a matter of course. In the foregoing description, the state variable observation unit 21 and the operation result obtaining unit 26 serve as functional blocks and can also be regarded as achieving both functions by a single block.

The machine learning device 20 illustrated as FIG. 1 will be described in detail below. The machine learning device 20 has the function of extracting, e.g., a useful rule, a knowledge representation, and a determination criterion based on analysis of a set of data input to the device, outputting the determination results, and learning knowledge (machine learning). A variety of machine learning techniques are available, which are roughly classified into, e.g., "supervised learning," "unsupervised learning," and "reinforcement learning." To implement these techniques, another technique called "deep learning" in which extraction of feature amounts themselves is learned is available. Although these types of machine learning (machine learning device 20) may use a general-purpose computer or processor, the use of, e.g., GPGPU (General-Purpose computing on Graphics Processing Units) or large-scale PC clusters allows higher-speed processing.

First, in supervised learning, a large number of sets of data of certain inputs and results (labels) are fed into the machine learning device 20, which learns features observed in these data sets and inductively acquires a model for estimating the result from the input, i.e., their relationship. The supervised learning is applicable to this embodiment for use in, e.g., a portion where a workpiece position is estimated from sensor input or a portion where a probability of success of obtaining a workpiece candidate is estimated. Supervised learning can be implemented using an algorithm such as a neural network (to be described later).

In unsupervised learning, only input data is fed into a learning device in large amounts, which learns the distribution of the input data and, in turn, performs learning with a device which, e.g., compresses, classifies, and shapes the input data without corresponding teacher output data being fed into the learning device. This allows, e.g., clustering of features seen in these data sets into similar features. The obtained result can be used to define certain criteria and allocate outputs in an optimizing manner according to the criteria, thus predicting an output.

Intermediate problem setting between unsupervised learning and supervised learning, called semi-supervised learning, is also available. This applies when, for example, only some data serve as data sets of inputs and outputs and the remaining data include only inputs. In this embodiment, learning can be efficiently performed by applying data (e.g., image data or simulation data) which can be obtained even without actual movement of the robot to unsupervised learning.

Reinforcement learning will be described below. Reinforcement learning problem setting will be considered as follows:

The robot observes the environmental state to decide its action;

The environment may change according to a certain rule and a human may change the environment by his or her own action;

A reward signal is returned every time action is taken;

The sum of (discount) rewards in the future is to be maximized;

Learning starts in a state in which a result to be brought about by the action is totally unknown or known only incompletely. In other words, the robot can obtain the result of an action as data only after it actually takes action. This means that an optimal action may be preferably searched for by trial and error; and Learning can be started at a good starting point by starting from the state in which learning has been performed in advance to imitate human behaviors (a technique such as the above-mentioned supervised learning or reverse reinforcement learning).

In reinforcement learning, in addition to determination and classification, an action is learned to acquire a method for learning an appropriate action in consideration of interactions exerted on the environment by the action, i.e., learning to maximize the reward to be obtained in the future. In this embodiment, this means, for example, attaining an action which influences the future, such as breakage of a pile of workpieces 12 to facilitate picking of the workpieces 12 in the future. Although this description will be followed by an example of Q-learning, the present invention is not limited to this.

In Q-learning, a value Q(s, a) of selection of an action a is learned in a particular environmental state s. In other words, an action a having the highest value Q(s, a) in the particular state s may be preferably selected as an optimal action. However, at first, a correct value Q(s, a) is totally unknown for a pair of a state s and an action a. The agent (the subject of an action) selects various actions a in the particular state s and rewards are offered for the actions a. With this operation, the agent learns to select a better action, i.e., a correct value Q(s, a).

To maximize the sum of rewards to be obtained in the future as a result of the actions, $Q(s, a) = E[\Sigma(\gamma^t)r_t]$ is to be finally satisfied, where E[ ] is the expected value, t is time, $\gamma$ is a parameter called the discount rate (to be described later), $r_t$ is the reward at time t, and $\Sigma$ is the sum at time t. The expected value in this expression is taken in response to a change in state that follows an optimal action and is an unknown value, which is learned by a search. An update expression of such a value Q(s, a) is given by, e.g.:

$$Q(s_t, a_t) \leftarrow Q(s_t, a_t) + \alpha\left(r_{t+1} + \gamma\max_a Q(s_{t+1}, a) - Q(s_t, a_t)\right) \quad (1)$$

where $s_t$ is the environmental state at time t and $a_t$ is the action at time t. Upon the action $a_t$, the state changes to $s_{t+1}$. $r_{t+1}$ is the reward received upon a change in state. The term attached with max is the product of the Q-value multiplied by γ when an action a having the highest Q-value known in the state $s_{t+1}$ is selected. γ is a parameter called the discount rate, satisfying 0<γ<1. α is a learning factor satisfying 0<α≤1.

Expression (1) represents a method for updating the evaluation value $Q(s_t, a_t)$ of the action $a_t$ in the state $s_t$, based on the reward $r_{t+1}$ returned as a result of the trial $a_t$. More specifically, when the sum of the reward $r_{t+1}$ and the evaluation value $Q(s_{t+1}, \max a_{t+1})$ of the best action max a in the state subsequent to the state s upon the action a is greater than the evaluation value $Q(s_t, a_t)$ of the action a in the state s, $Q(s_t, a_t)$ is increased; otherwise, $Q(s_t, a_t)$ is reduced. In other words, the value of a particular action in a particular state is brought close to the reward immediately returned as a result, and the value of the best action in the subsequent state upon the particular action.

Methods for representing Q (s, a) on the computer include a method for holding the numerical values of all state-action pairs (s, a) in the form of a table and a method for providing a function that approximates Q(s, a). With the latter method, above-mentioned expression (1) can be implemented by adjusting the parameter of an approximation function using a technique such as the stochastic gradient descent method. A neural network (to be described later) can be used as the approximation function.

Figure 2:
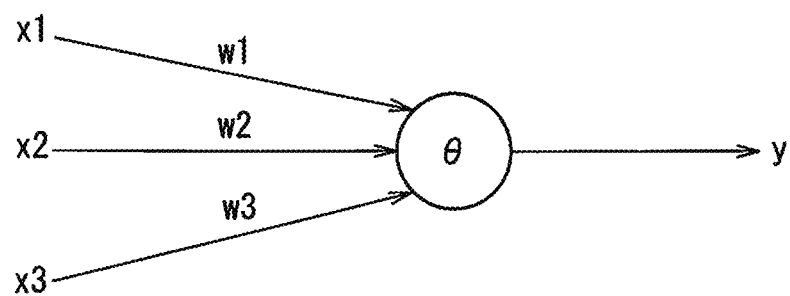
FIG. 2 is a diagram schematically representing a model for a neuron.
Figure 3:
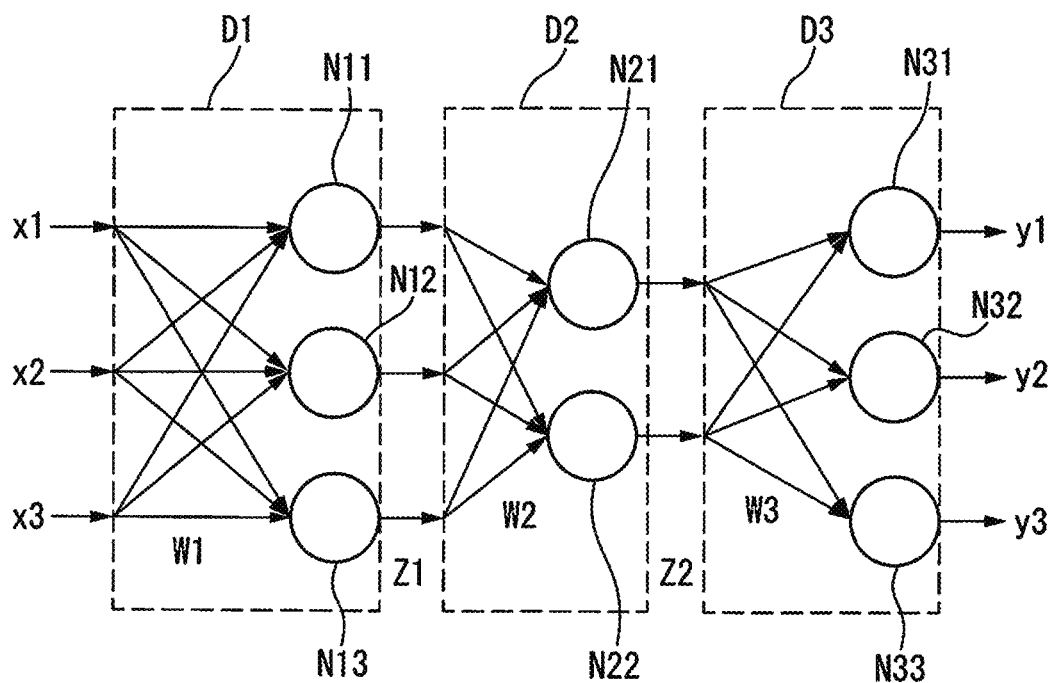
FIG. 3 is a diagram schematically representing a three-layer neural network formed by combining neurons as illustrated as FIG. 2 together.

Neural networks can also be used as learning models for supervised learning and unsupervised learning or approximation algorithms for value functions in reinforcement learning. FIG. 2 is a diagram schematically representing a model for a neuron, and FIG. 3 is a diagram schematically representing a three-layer neural network formed by combining neurons as illustrated as FIG. 2 together. More specifically, the neural network is implemented by, e.g., an arithmetic device and a memory imitating a model for a neuron as illustrated as, e.g., FIG. 2.

As illustrated as FIG. 2, the neurons serve to output an output (result) y for a plurality of inputs x (FIG. 2 illustrates inputs x1 to x3 as an example). Each input x (x1, x2, x3) is multiplied by a weight w (w1, w2, w3) corresponding to the input x. With this operation, the neurons output results y given by:

$$y = f_k(\Sigma_{i=1}^n x_i w_i - \theta) \quad (2)$$

where θ is the bias and $f_k$ is the activation function. Note that all of the input x, the result y, and the weight w are vectors.

A three-layer neural network formed by combining neurons as illustrated as FIG. 2 together will be described below with reference to FIG. 3. A plurality of inputs x (inputs x1 to x3 are taken as an example herein) are input from the left of the neural network and results y (results y1 to y3 are taken as an example herein) are output from the right of this network, as illustrated as FIG. 3. More specifically, the inputs x1, x2, and x3 are multiplied by a weight corresponding to each of three neurons N11 to N13 and are then input to the neurons. The weights used to multiply these inputs are collectively referred to as W1 herein.

The neurons N11 to N13 output z11 to z13, respectively. Referring to FIG. 3, z11 to z13 are collectively referred to as feature vectors Z1 and may be regarded as vectors obtained by extracting the feature amounts of input vectors. The feature vectors Z1 are defined between the weights W1 and W2. Z11 to z13 are multiplied by a weight corresponding to each of two neurons N21 and N22 and are then input to the neurons. The weights used to multiply these feature vectors are collectively referred to as W2 herein.

The neurons N21 and N22 output z21 and z22, respectively. Referring to FIGS. 3, z21 and z22 are collectively referred to as feature vectors Z2. The feature vectors Z2 are defined between the weights W2 and W3. z21 and z22 are multiplied by a weight corresponding to each of three neurons N31 to N33 and input. The weights used to multiply these feature vectors are collectively referred to as W3 herein.

Lastly, the neurons N31 to N33 output results y1 to y3, respectively. The operation of the neural network includes a learning mode and a value prediction mode. For example, the weight W is learned using a learning data set in the learning mode, and a robot action is determined in the prediction mode using the parameter. Although "prediction" has been referred to above for the sake of convenience, a variety of tasks such as detection, classification, and inference are possible, as a matter of course.

Data obtained by actually operating the robot in the prediction mode can be immediately learned and reflected on the subsequent action (online learning), or a group of data collected in advance can be used to perform collective learning and to subsequently execute the detection mode is executed using the same parameters (batch learning). As another, intermediate approach, the learning mode can be interposed every time a certain amount of data is accumulated.

The weights W1 to W3 can be learned by the error backpropagation method. The information of errors enters from the right and flows to the left. The error backpropagation method is used to adjust (learn) each weight to reduce the difference between the true output y (teacher) and the output y when the input x is input.

Such a neural network can have more than three layers (called deep learning). It is possible to automatically acquire from only teacher data an arithmetic device which extracts features of the input stepwise and returns a result.

The machine learning device 20 according to this embodiment includes, e.g., a state variable observation unit 21, an operation result obtaining unit 26, a learning unit 22, and a decision unit 25, as illustrated as FIG. 1, to execute the above-described Q-learning. However, the machine learning method applied to the present invention is not limited to Q-learning, as mentioned earlier. In other words, various techniques such as "supervised learning," "unsupervised learning," "semi-supervised learning," and "reinforcement learning" that can be used by the machine learning device are applicable. Although these types of machine learning (machine learning device 20) may use a general-purpose computer or processor, the use of, e.g., GPGPU or large-scale PC clusters allows higher-speed processing.

In other words, according to this embodiment, a machine learning device which learns an operation of a robot 14 for picking up, by a hand unit 13, any of a plurality of workpieces 12 placed in a random fashion, including a bulk-loaded state, includes a state variable observation unit 21, an operation result obtaining unit 26, and a learning unit 22. The state variable observation unit 21 observes the state variable of the robot 14, including data output from a three-dimensional measuring device 15 which measures a three-dimensional position (x, y, z) or a three-dimensional position and orientation (x, y, z, w, p, r) for each workpiece 12. The operation result obtaining unit 26 obtains a result of a picking operation of the robot 14 for picking up the workpiece 12 by the hand unit 13. The learning unit 22 learns manipulated variables including command data for commanding the robot 14 to perform a picking operation of the workpiece 12, in association with the state variable of the robot 14 and the result of the picking operation, upon receiving output from the state variable observation unit 21 and output from the operation result obtaining unit 26.

Examples of the state variable observed by the state variable observation unit 21 may include state variables for setting the position, orientation, and picking direction of the hand unit 13 in picking up one workpiece 12 from the box 11. Examples of the manipulated variables to be learned may include command values for, e.g., the torque, the velocity, and the rotation position sent from the controller 16 to the respective drive shafts of the robot 14 and the hand unit 13 in picking up the workpiece 12 from the box 11.

In picking up one of a plurality of workpieces 12 loaded in bulk, the learning unit 22 learns the above-mentioned state variables in association with the result of the picking operation of the workpiece 12 (the output of the operation result obtaining unit 26). In other words, the controller 16 randomly sets data output from the three-dimensional measuring device 15 (coordinate computation unit 19) and command data for the hand unit 13 or non-randomly sets them on the basis of a predetermined rule, and performs a picking operation of the workpiece 12 by the hand unit 13. Examples of the aforementioned predetermined rule may include picking up a plurality of workpieces 12 loaded in bulk, in descending order of height (Z). The data output from the three-dimensional measuring device 15 and the command data for the hand unit 13 thus correspond to an action of picking up one workpiece. Since success and failure of picking up the workpiece 12 occur, the learning unit 22 evaluates state variables including data output from the three-dimensional measuring device 15 and command data for the hand unit 13, every time such success and failure occur.

The learning unit 22 stores data output from the three-dimensional measuring device 15 and command data for the hand unit 13 in picking up the workpiece 12, and evaluation for the result of the picking operation of the workpiece 12, in association with each other. Examples of failure may include herein the case where the hand unit 13 may not grip the workpiece 12 or the workpiece 12 collides or comes into contact with the wall of the box 11 even when the hand unit 13 can grip the workpiece 12. Such success or failure of picking up the workpiece 12 is determined based on the value detected by the force sensor 17 or data captured by a three-dimensional measuring device 15. The machine learning device 20 can also perform learning using, e.g., part of command data for the hand unit 13 output from the controller 16.

The learning unit 22 in this embodiment preferably includes a reward computation unit 23 and a value function update unit 24. For example, the reward computation unit 23 computes a reward, such as a score, based on success or failure of picking up the workpiece 12 related to the above-mentioned state variables. The reward is set high for success of picking up the workpiece 12, and low for failure of picking up the workpiece 12. A reward may be computed based on the number of times picking of the workpiece 12 results in success in a predetermined time. Such a reward may further be computed in accordance with each stage of picking up the workpiece 12, such as success of gripping by the hand unit 13, success of transportation by the hand unit 13, or success of placing the workpiece 12.

The value function update unit 24 includes a value function describing the value of a picking operation of the workpiece 12 and updates the value function in accordance with the above-mentioned reward. The value function is updated using an update expression of a value $Q(s, a)$, as described above. In this updating, an action value table is preferably generated. The action value table means herein a record of associated information between data output from the three-dimensional measuring device 15 and command data for the hand unit 13 in picking up the workpiece 12, and a value function (i.e., an evaluation value) updated in accordance with the picking result of the workpiece 12 in the picking operation.

A function approximated using the above-mentioned neural network may also be used as such an action value table, and this is effective especially when the state s involves vast amounts of information as in, e.g., image data. The above-mentioned value function is not limited to one particular type. Examples of the value function may include a value function for evaluating success or failure of gripping the workpiece 12 by the hand unit 13, and that for evaluating the time (cycle time) taken for the hand unit 13 to grip and transport the workpiece 12.

As the above-mentioned value function, a value function for evaluating interference between the box 11 and the hand unit 13 or the workpieces 12 in workpiece picking may be used. To compute a reward used to update the value function, the state variable observation unit 21 preferably observes a force acting on the hand unit 13, such as a value detected by the force sensor 17. When the amount of change in force detected by the force sensor 17 is larger than a predetermined threshold, the aforementioned interference can be estimated to have occurred. Therefore, the reward obtained in this case is preferably set to take, e.g., a negative value so that the value defined by the value function is low.

According to this embodiment, measurement parameters of the three-dimensional measuring device 15 may also be learned as manipulated variables. In other words, according to this embodiment, a machine learning device which learns an operation of a robot 14 for picking up, by a hand unit 13, any of a plurality of workpieces 12 placed in a random fashion, including a bulk-loaded state, includes a state variable observation unit 21, an operation result obtaining unit 26, and a learning unit 22. The state variable observation unit 21 observes the state variable of the robot 14, including data output from a three-dimensional measuring device 15 which measures a three-dimensional position (x, y, z) or a three-dimensional position and orientation (x, y, z, w, p, r) for each workpiece 12. The operation result obtaining unit 26 obtains a result of a picking operation of the robot 14 for picking up the workpiece 12 by the hand unit 13. The learning unit 22 learns manipulated variables including measurement parameters of the three-dimensional measuring device 15, in association with the state variable of the robot 14 and the result of the picking operation, upon receiving output from the state variable observation unit 21 and output from the operation result obtaining unit 26.

The robot system 10 in this embodiment may further include an automatic hand replacement device (not illustrated) which replaces the hand unit 13 attached to the robot 14 with hand unit 13 having another form. In this case, the value function update unit 24 may preferably include the above-mentioned value function for each form-specific hand unit 13, and update the value function for the replaced hand unit 13 in accordance with the reward. This makes it possible to learn an optimal operation of the hand unit 13 for each form-specific hand unit 13 and, in turn, to allow the automatic hand replacement device to select a hand unit 13 exhibiting a higher value function.

The decision unit 25, for example, preferably selects data output from the three-dimensional measuring device 15 and command data for the hand unit 13, which correspond to the highest evaluation value, by looking up the action value table generated as described above. The decision unit 25 then outputs optimal data for the selected hand unit 13 and three-dimensional measuring device 15 to the controller 16.

The controller 16 uses optimal data for the hand unit 13 and the three-dimensional measuring device 15 output from the learning unit 22 to independently control the three-dimensional measuring device 15 and the robot 14 to pick up the workpiece 12. For example, the controller 16 preferably operates the respective drive shafts of the hand unit 13 and the robot 14, based on state variables for respectively setting an an optimal position, orientation, and picking direction of the hand unit 13 obtained by the machine learning device 20.

The robot system 10 in the above-described embodiment includes one machine learning device 20 for one robot 14, as depicted as FIG. 1. However, in the present invention, the numbers of robots 14 and machine learning devices 20 are not limited to one. For example, the robot system 10 may include a plurality of robots 14 such that at least one machine learning device 20 is disposed in correspondence with each robot 14. The robot system 10 preferably share or exchange optimal state variables for the three-dimensional measuring device 15 and the hand unit 13, obtained by the machine learning devices 20 of respective robots 14, with each other via a communication medium such as a network. Even when the operating rate of a given robot 14 is lower than that of a different robot 14, an optimal operation result obtained by the machine learning device 20 of the different robot 14 can be used for the operation of the given robot 14. The time taken for learning can even be shortened by sharing learning models among a plurality of robots, or sharing manipulated variables including measurement parameters of the three-dimensional measuring device 15 and the state variable and picking operation result of each robot 14.

The machine learning device 20 may be located within or outside the robot 14. Alternatively, the machine learning device 20 may be located within the controller 16 or on a cloud server (not illustrated).

When the robot system 10 includes a plurality of robots 14, one robot 14 can pick up a workpiece 12 with a hand unit 13 of the robot 14 while another robot 14 transports a workpiece 12 gripped by a hand unit 13 of the latter robot 14. The value function update unit 24 can further update the value function using the time during which such robots 14 that pick up the workpieces 12 are switched from one to another. The machine learning device 20 can even include state variables for a plurality of hand models, perform picking simulation based on the plurality of hand models during the picking operation of the workpiece 12, and learn the state variables for the plurality of hand models in association with the result of the picking operation of the workpiece 12, in accordance with the result of the picking simulation.

In the above-mentioned machine learning device 20, data output from the three-dimensional measuring device 15, upon obtaining data of a three-dimensional map for each workpiece 12 is sent from the three-dimensional measuring device 15 to the state variable observation unit 21. Since such sent data does not always include abnormal data, the machine learning device 20 may have the function of filtering abnormal data, i.e., that of selecting whether the data from the three-dimensional measuring device 15 is to be input to the state variable observation unit 21. With this arrangement, the learning unit 22 of the machine learning device 20 can efficiently learn an optimal operation of the hand unit 13 by the three-dimensional measuring device 15 and the robot 14.

In the above-mentioned machine learning device 20, the controller 16 receives data output from the learning unit 22. Since the data output from the learning unit 22 does not always include abnormal data either, a function of filtering abnormal data may be provided, i.e., that of selecting whether the data from the learning unit 22 is to be output to the controller 16. With this arrangement, the controller 16 can allow the robot 14 to more safely execute an optimal operation of the hand unit 13.

The above-mentioned abnormal data can be detected in accordance with the following procedure: a probability distribution for input data is estimated, the probability distribution is used to derive the probability of occurrence for new input, and abnormal data considerably deviating typical behaviors is regarded as being found when the probability of occurrence falls below a predetermined threshold.

Figure 4:
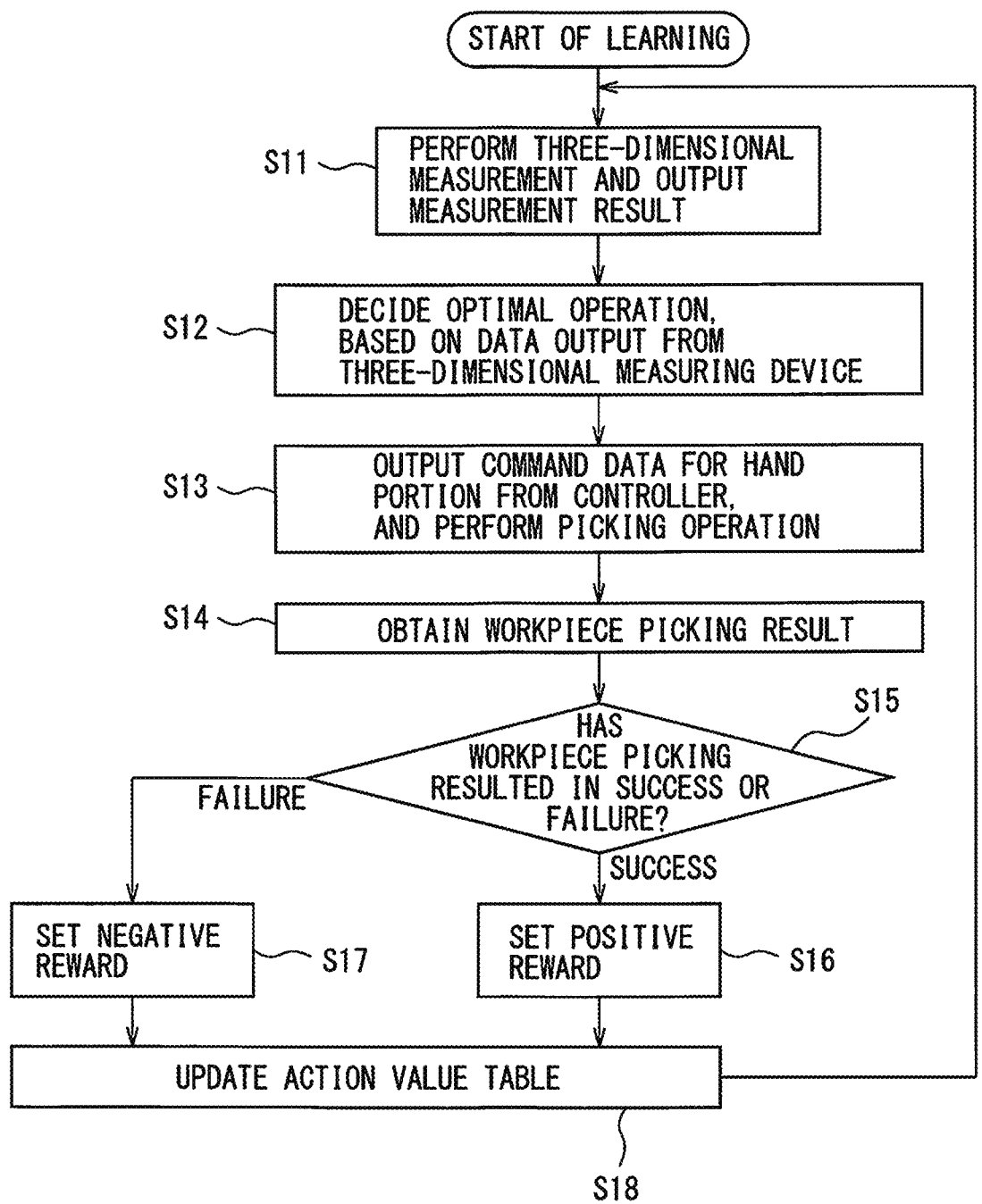
FIG. 4 is a flowchart illustrating an exemplary operation of the machine learning device illustrated as FIG. 1.

An exemplary operation of the machine learning device 20 of the robot system 10 in this embodiment will be described below. FIG. 4 is a flowchart illustrating an exemplary operation of the machine learning device illustrated as FIG. 1. As illustrated as FIG. 4, in the machine learning device 20 depicted as FIG. 1, when a learning operation (learning processing) is started, three-dimensional measurement is performed by the three-dimensional measuring device 15 and the measurement result is output (step S11 in FIG. 4). In other words, in step S11, for example, a three-dimensional map (data output from the three-dimensional measuring device 15) for each workpiece 12 placed in a random fashion, including a bulk-loaded state, is obtained and output to the state variable observation unit 21, and the coordinate computation unit 19 receives the three-dimensional map for each workpiece 12, and computes and outputs a three-dimensional position (x, y, z) for each workpiece 12 to the state variable observation unit 21, the operation result obtaining unit 26, and the controller 16. The coordinate computation unit 19 may compute and output an orientation (w, p, r) for each workpiece 12, based on the output of the three-dimensional measuring device 15.

The output (three-dimensional map) of the three-dimensional measuring device 15 may be input to the state variable observation unit 21 via a preprocessing unit 50 which processes the output (the three-dimensional map) before inputting it to the state variable observation unit 21, as will be described later with reference to FIG. 5. Only the output of the three-dimensional measuring device 15 may be input to the state variable observation unit 21 and may even be input to the state variable observation unit 21 via the preprocessing unit 50, as will be described later with reference to FIG. 7. In this manner, execution and output of three-dimensional measurement in step S11 may include various forms.

More specifically, in the case of FIG. 1, the state variable observation unit 21 observes a three-dimensional map for each workpiece 12 from the three-dimensional measuring device 15, and a state variable (data output from the three-dimensional measuring device 15), such as the three-dimensional position (x, y, z) and orientation (w, p, r), for each workpiece 12 from the coordinate computation unit 19. The operation result obtaining unit 26 obtains a result of a picking operation of the robot 14 for picking up the workpiece 12 by the hand unit 13, based on the data output from the three-dimensional measuring device 15 (the data output from the coordinate computation unit 19). The operation result obtaining unit 26 can obtain not only the data from the three-dimensional measuring device but also the result of the picking operation, such as the achievement level in transferring the picked workpiece 12 to a post-process and breakage of the picked workpiece 12.

For example, the machine learning device 20 decides an optimal operation, based on the data output from the three-dimensional measuring device 15 (step S12 in FIG. 4), and the controller 16 outputs command data (manipulated variables) for the hand unit 13 (robot 14) and performs a picking operation of the workpiece 12 (step S13 in FIG. 4). The workpiece picking result is obtained by the above-mentioned operation result obtaining unit 26 (step S14 in FIG. 4).

It is then determined based on the output from the operation result obtaining unit 26 whether picking of the workpiece 12 has resulted in success or failure (step S15 in FIG. 4). When picking of the workpiece 12 has resulted in success, a positive reward is set (step S16 in FIG. 4). When picking of the workpiece 12 has resulted in failure, a negative reward is set (step S17 in FIG. 4). The action value table (value function) is then updated (step S18 in FIG. 4).

It can be determined whether picking of the workpiece 12 has resulted in success or failure, based on, e.g., data output from the three-dimensional measuring device 15 after the picking operation of the workpiece 12. Determination as to whether picking of the workpiece 12 has resulted in success or failure is not limited to evaluation as to whether picking of the workpiece 12 has resulted in success or failure, and may include evaluation of, e.g., the achievement level in transferring the picked workpiece 12 to a post-process, the occurrence or non-occurrence of a change in state, such as breakage, of the picked workpiece 12, or the time (cycle time) or energy (amount of power) taken for the hand unit 13 to grip and transport the workpiece 12.

A reward value is computed by the reward computation unit 23 based on determination as to whether picking of the workpiece 12 has resulted in success or failure, and the action value table is updated by the value function update unit 24. In other words, when picking of the workpiece 12 has resulted in success, the learning unit 22 sets a positive reward in the above-mentioned update expression of a value Q(s, a) (step S16); otherwise, the learning unit 22 sets a negative reward in the above-mentioned update expression (step S17). The learning unit 22 updates the above-mentioned action value table every time the workpiece 12 is picked up (step S18). The learning unit 22 continues (learns) to update the action value table by repeating above-mentioned steps S11 through S18.

In the foregoing description, data input to the state variable observation unit 21 is not limited to data output from the three-dimensional measuring device 15, but may include data such as the output of other sensors, and part of command data from the controller 16 may even be used. Thus, the controller 16 causes the robot 14 to perform a picking operation of the workpiece 12, using command data (manipulated variables) output from the machine learning device 20. Learning by the machine learning device 20 is not limited to the picking operation of the workpiece 12, and measurement parameters of the three-dimensional measuring device 15, for example, may be learned, as described earlier.

As described above, the robot system 10 including the machine learning device 20 in this embodiment can learn an operation of the robot 14 for picking up any of a plurality of workpieces 12 placed in a random fashion, including a bulk-loaded state, by the hand unit 13. Thus, the robot system 10 can learn selection of an optimal operation of the robot 14, for picking the workpieces 12 loaded in bulk, without human intervention.

Figure 5:
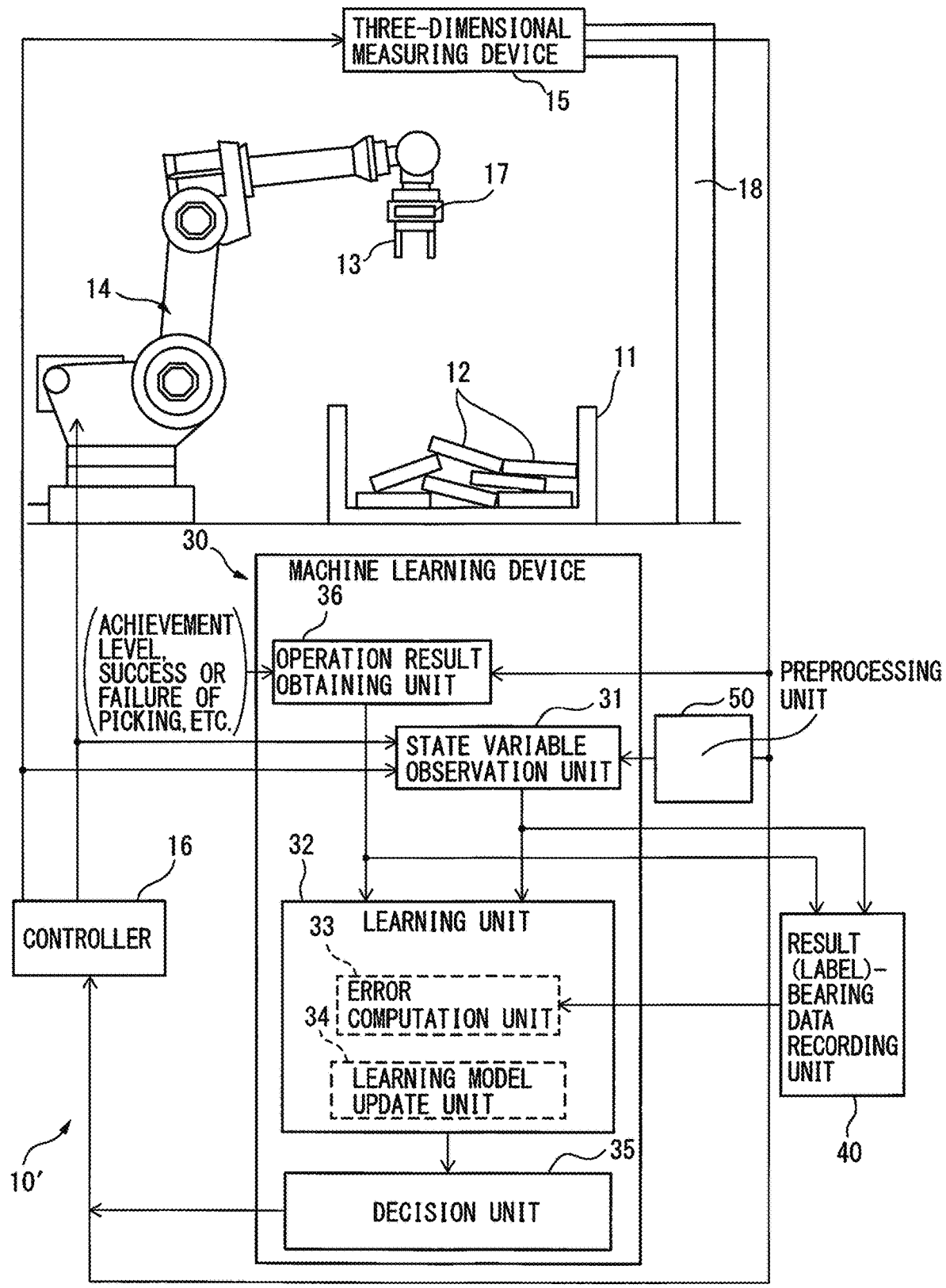
FIG. 5 is a block diagram illustrating the conceptual configuration of a robot system in another embodiment of the present invention.

FIG. 5 is a block diagram illustrating the conceptual configuration of a robot system in another embodiment of the present invention, and represents a robot system that uses supervised learning. As is obvious from a comparison of FIG. 5 with FIG. 1 described earlier, a robot system 10' that uses supervised learning illustrated as FIG. 5 is provided by adding a result (label)-bearing data recording unit 40 to the robot system 10 that uses Q-learning (reinforcement learning) illustrated as FIG. 1. The robot system 10' illustrated as FIG. 5 further includes a preprocessing unit 50 which preprocesses data output from a three-dimensional measuring device 15. The preprocessing unit 50 may be provided to, e.g., the robot system 10 illustrated as FIG. 1, as a matter of course.

A machine learning device 30 in the robot system 10' that uses supervised learning includes a state variable observation unit 31, an operation result obtaining unit 36, a learning unit 32, and a decision unit 35, as depicted as FIG. 5. The learning unit 32 includes an error computation unit 33 and a learning model update unit 34. In the robot system 10' according to this embodiment as well, the machine learning device 30 learns and outputs manipulated variables such as command data for commanding a robot 14 to perform a picking operation of a workpiece 12 or measurement parameters of the three-dimensional measuring device 15.

In other words, in the robot system 10' that uses supervised learning illustrated as FIG. 5, the error computation unit 33 and the learning model update unit 34 correspond to the reward computation unit 23 and the value function update unit 24, respectively, in the robot system 10 that uses Q-learning illustrated as FIG. 1. Other configurations such as those of the three-dimensional measuring device 15, a controller 16, and the robot 14 are the same as in FIG. 1 described earlier, and a description thereof will not be given.

The error computation unit 33 computes the error between the result (label) output from the operation result obtaining unit 36 and the output of a learning model mounted in the learning unit. The result (label)-bearing data recording unit 40 can, for example, hold result (label)-bearing data obtained by the day before a predetermined day on which the robot 14 performs a task when the shapes of the workpieces 12 and the processes by the robot 14 remain unchanged, and provide the result (label)-bearing data held in the result (label)-bearing data recording unit 40 to the error computation unit 33 on the predetermined day. Alternatively, data obtained through, e.g., simulation performed outside the robot system 10' or result (label)-bearing data obtained by another robot system may be provided to the error computation unit 33 of the robot system 10' via a memory card or a communication line. The result (label)-bearing data recording unit 40 may even be implemented in a non-volatile memory such as a flash memory and built into the learning unit 32 so that the result (label)-bearing data held in the result (label)-bearing data recording unit 40 can be directly used in the learning unit 32.

FIG. 6 illustrates views for explaining exemplary processing of a preprocessing unit in the robot system illustrated as FIG. 5. FIG. 6 illustrates in (a), an example of data of the three-dimensional positions (orientations) of a plurality of workpieces 12 packed in bulk in a box 11, i.e., data output from the three-dimensional measuring device 15, and in (b) to (d), exemplary image data after preprocessing of workpieces 121 to 123 illustrated in (a) of FIG. 6.

Cylindrical metal parts are assumed as the workpieces 12 (121 to 123), and a suction pad which, for example, draws the longitudinal central portions of the cylindrical workpieces 12 using a negative pressure, instead of gripping them with two gripper portions, is assumed as the hand (13). As long as, for example, the positions of the longitudinal central portions of the workpieces 12 are determined, the workpieces 12 can be picked up by moving the suction pad (13) to these positions and drawing the workpieces 12 by suction. Numerical values used in (a) to (d) of FIG. 6 represent the X-, Y-, and Z-directions in units of [mm]. Note that the Z-direction corresponds to the direction of height (depth) of image data obtained by capturing the box 11, accommodating a plurality of workpieces 12 loaded in bulk, using the three-dimensional measuring device 15 (e.g., including two cameras) located above the box 11.

As is obvious from a comparison of (b) through (d) of FIG. 6 with (a) of FIG. 6, as exemplary processing by the preprocessing unit 50 in the robot system 10' illustrated as FIG. 5, the workpieces 12 of interest (e.g., the three workpieces 121 to 123) are rotated and processed to adjust their center heights to "0," based on data (three-dimensional image) output from the three-dimensional measuring device 15.

In other words, data output from the three-dimensional measuring device 15 includes, e.g., information indicating the three-dimensional position (x, y, z) and orientation (w, p, r) of the longitudinal central portion of each workpiece 12. In this case, the three workpieces 121, 122, and 123 of interest are rotated by −r and subtracted by z to uniform all their conditions, as illustrated as (b), (c), and (d) of FIG. 6. The load of the machine learning device 30 can be reduced by such preprocessing.

The three-dimensional image depicted as (a) of FIG. 6 is not data itself output from the three-dimensional measuring device 15 but, e.g., that obtained by lowering the threshold for selection from an image obtained by a program defining the order of picking of the workpieces 12, implemented conventionally. This processing itself may even be performed by the preprocessing unit 50. Such processing by the preprocessing unit 50 may diversely vary depending on a variety of conditions, including, e.g., the shapes of the workpieces 12 and the type of hand 13, as a matter of course.

In this manner, the preprocessing unit 50 inputs to the state variable observation unit 31, data (a three-dimensional map for each workpiece 12) output from the three-dimensional measuring device 15 processed before being input to the state variable observation unit 31. Referring again to FIG. 5, letting, for example, y be the output of the neural network illustrated as FIG. 3 as a learning model, the error computation unit 33 that receives a result (label) output from the operation result obtaining unit 36 determines that an error $-\log(y)$ exists when the actual picking operation of the workpiece 12 has resulted in success and that an error $-\log(1-y)$ exists when this operation has resulted in failure, and performs processing aiming at minimizing the error. As an input to the neural network illustrated as FIG. 3, for example, image data of the workpieces 121 to 123 of interest after preprocessing, as depicted as (b) to (d) of FIG. 6, and data of the three-dimensional position and orientation (x, y, z, w, p, r) for each of the workpieces 121 to 123 are provided.

Figure 7:
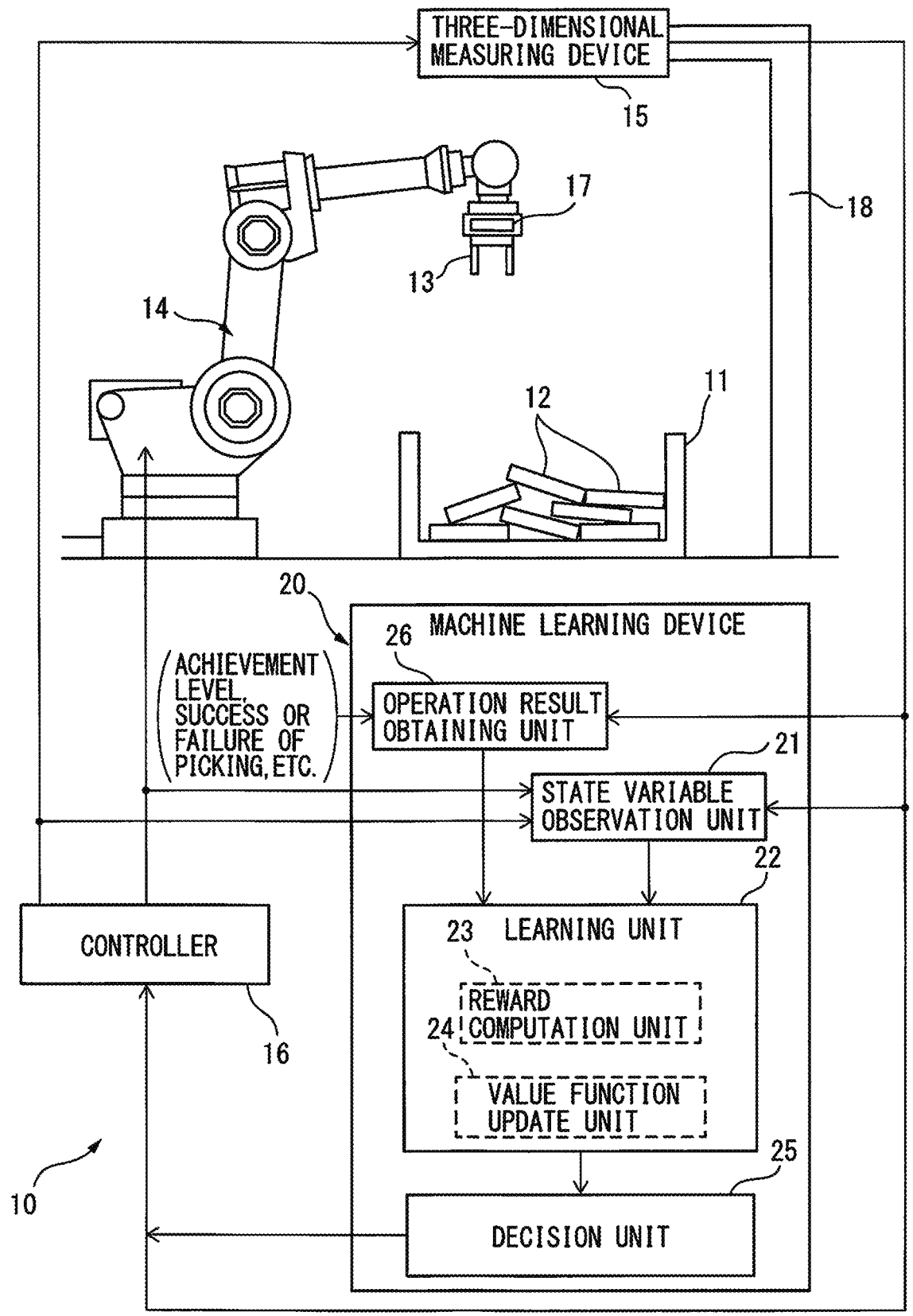
FIG. 7 is a block diagram illustrating a modification of the robot system illustrated as FIG. 1.

FIG. 7 is a block diagram illustrating a modification of the robot system illustrated as FIG. 1. As is obvious from a comparison of FIG. 7 with FIG. 1, in the modification of the robot system 10 illustrated as FIG. 7, the coordinate computation unit 19 is omitted, and the state variable observation unit 21 observes the state variable of the robot 14 upon receiving only a three-dimensional map from the three-dimensional measuring device 15. Note, however, that the controller 16 may naturally be equipped with a configuration equivalent to the coordinate computation unit 19. The configuration illustrated as FIG. 7 is also applicable to, e.g., the robot system 10' that uses supervised learning described earlier with reference to FIG. 5. In other words, in the robot system 10' illustrated as FIG. 5, the preprocessing unit 50 can be omitted, and the state variable observation unit 31 can observe the state variable of the robot 14 upon receiving only a three-dimensional map from the three-dimensional measuring device 15. In this manner, various changes and modifications can be made to the above-described embodiments.

As described in detail above, according to this embodiment, it is possible to provide a machine learning device, a robot system, and a machine learning method which can learn an optimal operation of a robot in picking up workpieces placed in a random fashion, including a bulk-loaded state, without human intervention. The machine learning devices 20 and 30 in the present invention are not limited to those that use reinforcement learning (e.g., Q-learning) or supervised learning, and various machine learning algorithms are applicable.

The machine learning device, the robot system, and the machine learning method according to the present invention have an advantageous effect of learning an optimal operation of a robot in picking up workpieces placed in a random fashion, including a bulk-loaded state, without human intervention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A machine learning device for learning an operation of a robot for picking up, by a hand unit, any of a plurality of workpieces, the machine learning device comprising:
   a memory; and
   at least one processor coupled to the memory, the at least one processor being configured to:
      obtain a state variable including
         output data from a measuring device configured to obtain information of each of the plurality of workpieces,
      obtain a result of a picking operation of the robot for picking up a workpiece among the plurality of workpieces by the hand unit,
      learn a manipulated variable for the robot to perform a picking operation for picking up a workpiece, in association with the state variable and the result of the picking operation, upon receiving the state variable and the result of the picking operation,
      compute a reward, based on the result of the picking operation, and
      update a value function describing a value of a picking operation for picking up a workpiece in accordance with the computed reward,
   wherein the at least one processor is further configured to:
      obtain, based on the value function, the manipulated variable for setting a position, orientation and picking direction of the hand unit, and output command data to operate drive shafts of the robot and the hand unit on the basis of the obtained manipulated variable, wherein the value function is obtained from a neural network.

2. The machine learning device according to claim 1, wherein the manipulated variable includes a measurement parameter of the measuring device.

3. The machine learning device according to claim 2, wherein the at least one processor is further configured to:
decide the measurement parameter by referring to the manipulated variable.

4. The machine learning device according to claim 1, wherein the state variable further includes data configured to compute a three-dimensional position of each of the plurality of workpieces, based on the output data from the measuring device.

5. The machine learning device according to claim 4, wherein the at least one processor is further configured to compute an orientation of each of the plurality of workpieces.

6. The machine learning device according to claim 1, further comprising:
a preprocessor configured to process the output data from the measuring device,
wherein the at least one processor is configured to receive data output from the preprocessor as the state variable of the robot.

7. The machine learning device according to claim 6, wherein the preprocessor is further configured to uniform each of the plurality of workpieces in direction and height in the output data from the measuring device.

8. The machine learning device according to claim 1, wherein the at least one processor is further configured to obtain information indicating at least one of
success and failure of picking of a workpiece,
a state of damage of a workpiece, or
an achievement level in transferring a picked workpiece to a post-process.

9. A robot system comprising the machine learning device according to claim 1,
the system further comprising:
the robot;
the measuring device; and
a controller configured to control the robot.

10. The robot system according to claim 9, wherein
the robot system comprises a plurality of robots, and a plurality of machine learning devices,
each of the plurality of machine learning devices is provided to a corresponding robot among the plurality of robots, and
the plurality of machine learning devices provided to the plurality of robots are configured to share or exchange data with each other via a communication medium.

11. The robot system according to claim 9, wherein the machine learning device is located on a cloud server.

12. The machine learning device according to claim 1, wherein the at least one processor is further configured to learn an optimal operation of the robot in picking up an optimal workpiece among the plurality of workpieces placed in a random fashion in accordance with the information obtained for each of the plurality of workpieces.

13. The machine learning device according to claim 1, wherein the at least one processor is further configured to compute the reward to be high for success of picking up the workpiece, and low for failure of picking up the workpiece.

14. The machine learning device according to claim 1, wherein the at least one processor is further configured to compute the reward based on the number of times the picking operation results in success in a predetermined time.

15. The machine learning device according to claim 1, wherein the at least one processor is further configured to compute the reward in accordance with each stage of picking up a workpiece, including at least one of success of gripping by the hand unit, success of transportation by the hand unit, or success of placing the workpiece.

16. The machine learning device according to claim 1, wherein the state variable further includes at least one of the position, orientation or picking direction of the hand unit in picking up the workpiece among the plurality of workpieces.

17. A machine learning device for learning an operation of a robot for picking up, by a hand unit, any of a plurality of workpieces, the machine learning device comprising:
a memory; and
at least one processor coupled to the memory, the at least one processor being configured to:
obtain a state variable including
output data from a measuring device configured to obtain information of each of the plurality of workpieces,
obtain a result of a picking operation of the robot for picking up a workpiece among the plurality of workpieces by the hand unit,
learn a manipulated variable for the robot to perform a picking operation for picking up a workpiece, in association with the state variable and the result of the picking operation, upon receiving the state variable and the result of the picking operation,
learn a picking operation for picking up a workpiece by using a learning model,
compute an error, based on the result of the picking operation and the learning model, and
update the learning model in accordance with the computed error,
wherein the at least one processor is further configured to:
obtain, based on the learning model, the manipulated variable for setting a position, orientation and picking direction of the hand unit, and
output command data to operate drive shafts of the robot and the hand unit on the basis of the obtained manipulated variable,
wherein the learning model is obtained from a neural network.

18. The machine learning device according to claim 17, wherein the state variable further includes at least one of the position, orientation or picking direction of the hand unit in picking up the workpiece among the plurality of workpieces.

19. The machine learning device according to claim 17, wherein the manipulated variable includes a measurement parameter of the measuring device.

20. A machine learning method of learning an operation of a robot for picking up, by a hand unit, any of a plurality of workpieces, the method comprising:
obtaining a state variable including
output data from a measuring device configured to obtain information of each of the plurality of workpieces
obtaining a result of a picking operation of the robot for picking up a workpiece among the plurality of workpieces by the hand unit;
learning a manipulated variable for the robot to perform a picking operation for picking up a workpiece, in association with the state variable and the result of the picking operation, upon receiving the state variable and the result of the picking operation;

computing a reward, based on the result of the picking operation; and updating a value function describing a value of a picking operation for picking up a workpiece in accordance with the computed reward, wherein the method further comprises:

obtaining, based on the value function, the manipulated variable for setting a position, orientation and picking direction of the hand unit; and outputting command data to operate drive shafts of the robot and the hand unit on the basis of the obtained manipulated variable, wherein the value function is obtained from a neural network.

21. A machine learning method of learning an operation of a robot for picking up, by a hand unit, any of a plurality of workpieces, the method comprising:

obtaining a state variable including output data from a three dimensional measuring device;

obtaining a result of a picking operation of the robot for picking up a workpiece among the plurality of workpieces by the hand unit;

learning a manipulated variable for the robot to perform a picking operation for picking up a workpiece, in association with the state variable and the result of the picking operation, upon receiving the state variable and the result of the picking operation;

learning a picking operation for picking up a workpiece by using a learning model;

computing an error, based on the result of the picking operation and the learning model; and updating the learning model in accordance with the computed error, wherein the method further comprises:

obtaining, based on the learning model, the manipulated variable for setting a position, orientation and picking direction of the hand unit; and outputting command data to operate drive shafts of the robot and the hand unit on the basis of the obtained manipulated variable, wherein the learning model is obtained from a neural network.

\* \* \* \* \*